United States Patent [19]

Beck

[11] 4,329,135
[45] May 11, 1982

[54] DEVICE FOR THE CONTINUOUS THERMAL OR THERMO-CHEMICAL TREATMENT OF OBJECTS BY EMISSION OF MICRO-WAVES

[75] Inventor: Michel Beck, Enghien-les-Baines, France

[73] Assignee: Technics Lambda International, Enghien-les-Baines, France

[21] Appl. No.: 131,848

[22] Filed: Mar. 19, 1980

[51] Int. Cl.$^3$ .............................................. B29H 5/24
[52] U.S. Cl. .............................. 425/174; 219/10.55 R; 264/26; 425/174.4; 425/404
[58] Field of Search ...................... 425/174, 174.4, 404, 425/445; 219/10.55, 1; 264/25, 26, 22

[56] References Cited

U.S. PATENT DOCUMENTS 3,478,187 11/1969 Agdur ........................... 219/10.55 R
3,745,291 7/1973 Peterson ........................ 219/10.55
4,003,554 1/1977 Chauffoureaux ................... 425/206

FOREIGN PATENT DOCUMENTS 2737182 1/1979 Fed. Rep. of Germany .

Primary Examiner—Donald E. Czaja
Assistant Examiner—W. Thompson
Attorney, Agent, or Firm—Scully, Scott, Murphy & Presser

[57] ABSTRACT

This device comprises an applicator in which the microwaves are generated. Inside this applicator is disposed a tubular enclosure, preferably coaxial, made from a material inert to the micro-waves which is connected to means for generating a relative vacuum or treatment gas atmosphere. This enclosure is sealed and comprises means allowing the objects to be treated to enter therein or leave therefrom while ensuring the continuity of the seal.

8 Claims, 1 Drawing Figure

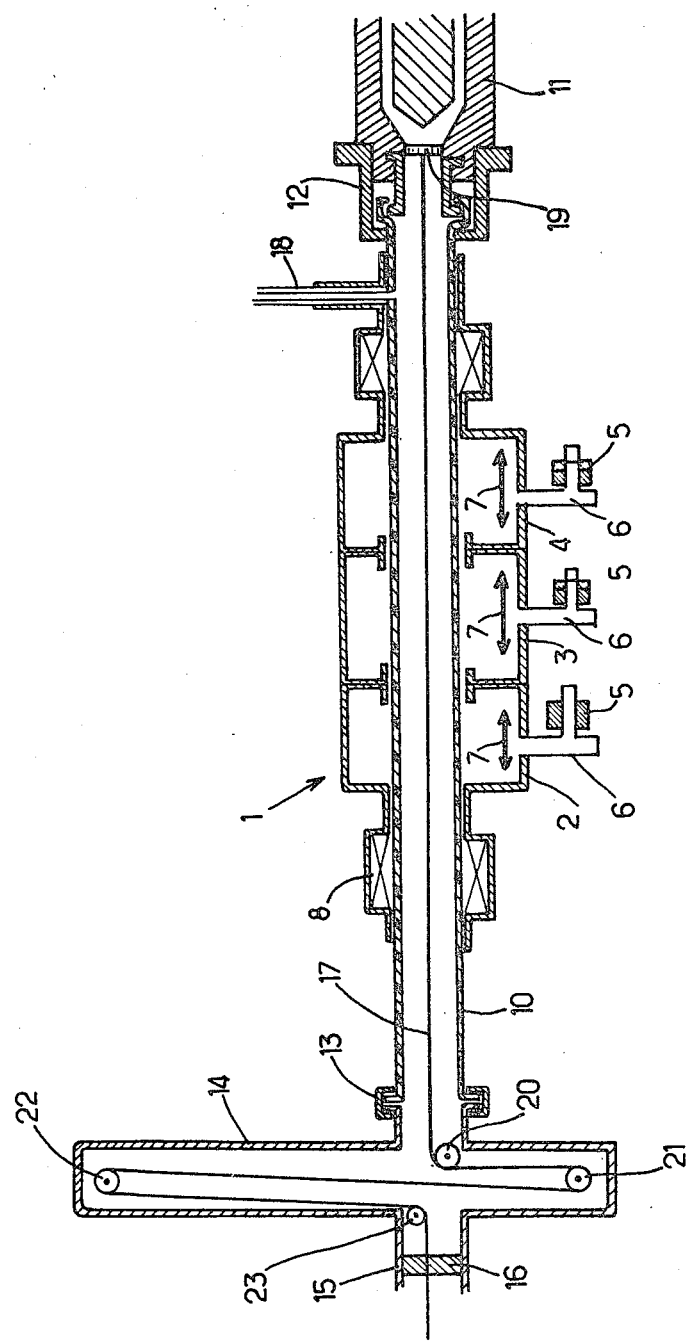

DEVICE FOR THE CONTINUOUS THERMAL OR THERMO-CHEMICAL TREATMENT OF OBJECTS BY EMISSION OF MICRO-WAVES

The present invention relates to a device for the continuous thermal or thermo-chemical treatment of objects by emission of micro-waves.

It applies more particularly, but not exclusively, to the continuous vulcanization or curing of sections or pipes made from one or more vulcanizable or curable materials, particularly when leaving an extruder.

Usually, to carry out such treatment by the use of micro-waves, the section leaving an extruder is caused to travel through an apparatus generally called an applicator, inside which are generated electro-magnetic waves created by a magnetron. Such an applicator consists of a non magnetic metal enclosure whose dimensions are calculated with respect to the frequency and the energy density required for a given product and the heating which it is desired to obtain.

Generally, there is currently used as applicator, circular or even rectangular wave-guides which allow a high energy density and a high hourly rate of production to be obtained.

Furthermore, it is known that numerous thermal or thermo-chemical treatments such for example as the curing of sections made from rubber or a thermoplastic material, such a polyethylene, must be carried out in a pressurized neutral gas atmosphere (nitrogen, carbonic gas, etc...) or even, for other applications, in a relative vacuum.

For this purpose then applicators are constructed which are strictly gas-tight and whose inlet and outlet orifices are equipped with a device ensuring the continuity of the seal during the passage of the section.

So applicators are obtained whose total internal volume is subjected to the pressurized neutral gas atmosphere or a relative vacuum, a feature which presents a certain number of drawbacks:

The volume to be maintained under pressure or under a vacuum at a temperature substantially equal to the treatment temperature, is relatively large, which implies costly installations and a disproportionate consumption of energy in relation to the energy alone required for carrying out the treatment.

There occurs a considerable heat loss, particularly on the walls of the applicator which, as previously mentioned, are made from a generally good conducting metal, as well as harmful heating of the electro-magnetic wave generator.

Further, because of the overpressure inside the applicator, dust, smoke or other impurities may be deposited inside the micro-wave generator and thus form parasitic charges.

The invention has then as an aim to remedy these drawbacks.

For this it proposes disposing, inside an applicator of the type previously described, a tubular preferably coaxial enclosure made from a material inert to micro-waves, for example from glass charged quartz or teflon, inside which said pressurized treatment gas atmosphere or a relative vacuum is provided, this enclosure being gastight and comprising means allowing the access and exit of objects to be treated while ensuring continuity of the seal.

According to another feature of the invention, in the case of continuous vulcanization or curing of objects such as sections or pipes made from at least one vulcanizable or curable material, at the exit from an extruder, the access orifice of said tubular enclosure may be sealingly fixed at the head of the extruder whereas its outlet end is provided with a system creating a seal between said tube and said objects, this sealing system being for example a leakage joint of the kind currently used in cable-making and which, by counter pressure, establishes a pressure balance between the inside of the enclosure and the external pressure downstream of the joint.

Similarly, this seal could also be obtained by means of a die mounted on the outlet orifice of the enclosure and intended to complete or even modify the shape of the section. In this case, the seal is obtained by the pressure exerted by the section on the internal walls of the die.

The exit orifice of the enclosure may also be sealingly connected to the inlet orifice of an apparatus for carrying out an operation consecutive to the treatment properly speaking, such as a temperature maintaining operation or even for winding a section on a mandrel. In this case, the atmosphere in which these operations are carried out must be preferably the same at that which reigns inside the applicator.

One embodiment of the invention will be described below by way of non limiting example with reference to the accompanying drawing in which:

The single FIGURE is an axial section of a device for curing a section or a pipe made from at least one curable material.

In this device, the applicator 1 is formed from three modular cylindrical resonating cavities 2, 3 and 4 assembled together. In each of these cavities 2, 3 and 4 the micro-waves are generated by means of a unit comprising a magnetron 5, a matching guide 6 and a radiating atenna 7 disposed in the cavity. This applicator 1 may further comprise, as shown, at one at least of these orifices, absorbing charges 8 for preventing the propagation of the micro-waves outside the applicator.

A coaxial circular tube 10 made from a material inert to the micro-waves such for example as glass charged quartz or teflon passes through applicator 1.

This tube 10 is sealingly connected, on the one hand, at one of its ends, to the outlet head of an extruder 11, by means of a conventional mechanical locking system 12 and, on the other hand, at its other end by a conventional sealed connection, to the inlet orifice of a temperature maintaining station 14 whose outlet orifice 15 is provided with a device 16 for obtaining a dynamic seal between its own wall and said section 17.

Futhermore, the circular tube 10 is connected (conduit 18) to a pressurized gas source being possibly preheated to a temperature substantially equal to the treatment temperature.

In such a system, the section 17 formed by die 19, with which the head of extruder 11 is provided, travels continuously in circular tube 10 then, by means of a system of guide pulleys 20, 21, 22 and 23, in the temperature maintaining station 14 from which it leaves, at the end of its travel path, through the outlet orifice 15, through the dynamic sealing device 16.

During its travel in the region of circular tube 10, situated at right angles to the resonating cavities 2, 3 and 4, section 17 is subjected to the action of micro-waves and undergoes deep heating unit it reaches the treatment temperature. The section is then maintained at this temperature until it leaves the temperature maintaining station, once the vulcanization or curing has been completed.

What is claimed is:

1. A device for the continuous thermal treatment of objects by emission of micro-waves, comprising an applicator inside which the micro-waves are generated, characterized in that it comprises inside said applicator a tubular coaxial enclosure made from a material inert to the micro-waves, through which pass the objects to be treated, and connected to means for generating a relative vacuum or treatment gas atmosphere, this enclosure being sealed and comprising means allowing objects to be treated to enter and leave while ensuring the continuity of the seal.

2. A device according to claim 1, characterized in that said applicator comprises at least one resonating cavity.

3. A device for the continuous vulcanization or curing of sections or pipes made from at least one curable or vulcanizable material, at the outlet of an extruder, as claimed in claim 1 or 2, characterized in that the access orifice to said enclosure comprises means for sealingly fixing it to the head of the extruder, whereas its outlet end is provided with a system creating a seal between said tube and said objects.

4. A device according to claim 3, characterized in that said system consists in a leakage joint which, by counter pressure, establishes a pressure balance between the inside of the enclosure and the external pressure downstream of the joint.

5. A device according to claim 3, characterized in that said sealing system consists in a die mounted on the outlet orifice of the enclosure to modify the shape of the section.

6. A device according to claim 1 or 2, characterized in that said enclosure is sealingly connected to the inlet orifice of an apparatus carrying out an operation consecutive to said treatment.

7. A device according to claim 1 or 2, characterized in that said applicator comprises, at one at least of its orifices, absorbing charges for preventing the propagation of the micro-waves outside the applicator.

8. A device according to claim 6, said operation being a temperature maintaining operation.

* * * * *